April 26, 1955 W. STEGEMAN 2,707,066
REVERSIBLE EJECTOR-TYPE ARTICLE DISPENSER
Filed Dec. 7, 1953
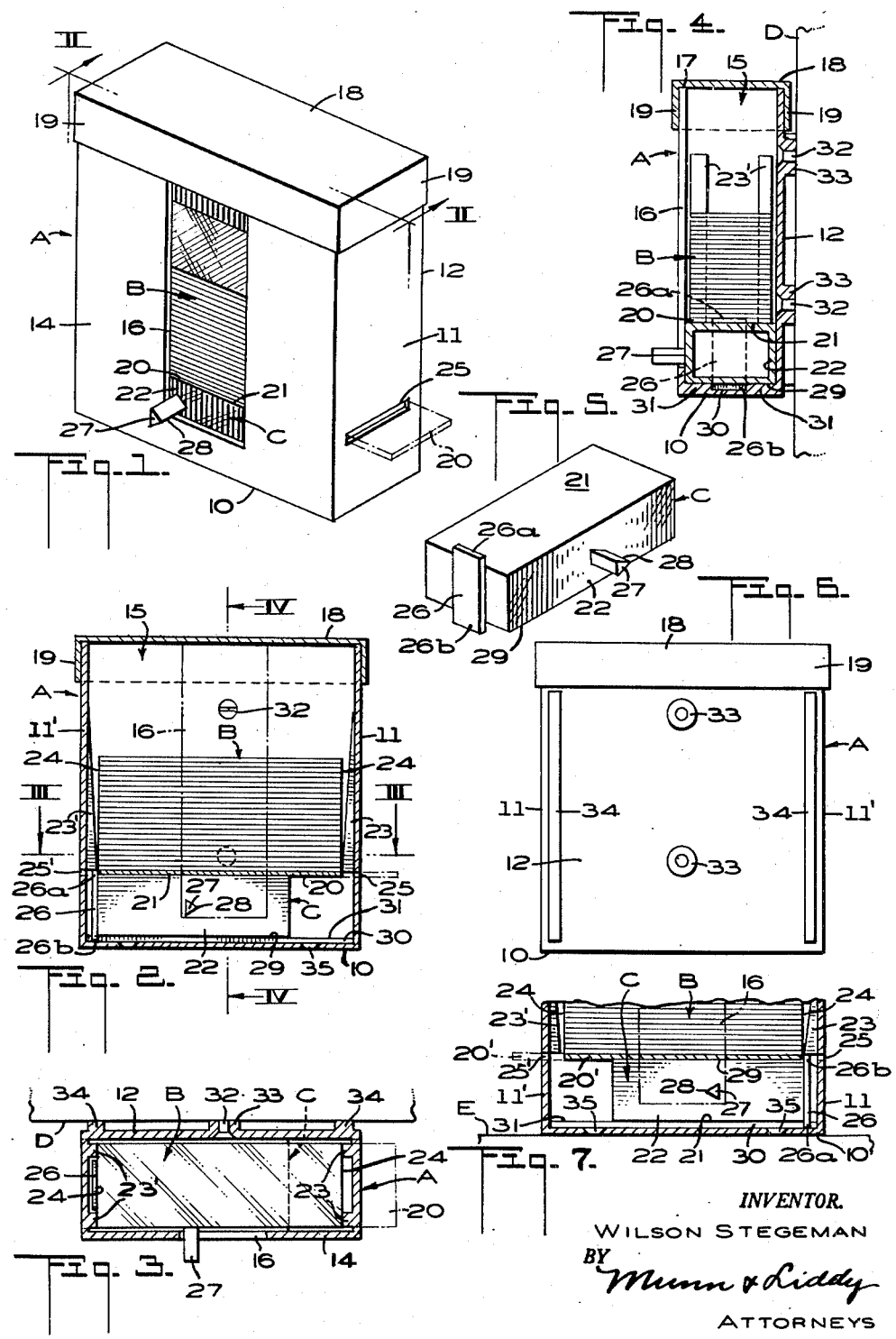
INVENTOR.
WILSON STEGEMAN
BY
Munn & Liddy
ATTORNEYS

United States Patent Office 2,707,066
Patented Apr. 26, 1955

2,707,066

REVERSIBLE EJECTOR-TYPE ARTICLE DISPENSER

Wilson Stegeman, Santa Rosa, Calif.

Application December 7, 1953, Serial No. 396,596

6 Claims. (Cl. 221—255)

The present invention relates to improvements in an ejector-type article holder and dispenser. It is especially adapted for use by physicians, and other technicians, for dispensing glass slides that are utilized in making microscopic examinations, although it is not limited to this particular article.

It will be appreciated, of course, that any finger print displayed on such a glass slide will be a disturbing factor to the physician, when viewing the specimens on the slide through a microscope. Accordingly, the dispenser disclosed herein has been designed in such a manner that initially only a restricted portion of each slide is projected from the holder for manually grasping by an individual, thereby confining finger prints to this portion of the glass slide. Thereafter the slide may be withdrawn from the holder, care being taken to prevent finger prints from being impressed on the remainder of the slide.

Moreover, it is proposed to provide a device of the character described, which may be mounted on a suitable support, such as a wall or a desk, and effectively employed for selectively dispensing the slides, or other articles, from either lateral side of holder, depending upon the mounting of the latter.

Another object is to provide a device of the type described, which may be loaded with glass slides, or other articles, with rapidity and ease, without breaking or damaging the slides.

Other objects and advantages will appear as the specification continues. The novel features will be pointed out in the claims hereunto appended.

Drawing

For a better understanding of the invention reference should be had to the accompanying drawing, forming part of this application, in which:

Figure 1 is a persepective view of the ejector-type article holder and dispenser;

Figure 2 is a vertical sectional view taken along the plane II—II of Figure 1, disclosing the reciprocating ejector arranged to dispense glass slides from the right-hand side of the holder;

Figures 3 and 4 are horizontal and vertical sectional views taken along the lines III—III and IV—IV, respectively, of Figure 2;

Figure 5 is a perspective view of the reciprocating ejector;

Figure 6 is a rear elevational view of the holder; and

Figure 7 is a fragmentary sectional view, corresponding to the lower part of Figure 2, but illustrating the ejector turned upside down and reversed end-for-end so as to dispense the slides from the left-hand side of the holder.

While I have shown only the preferred form of my invention, it should be understood that various changes, or modifications, may be made within the scope of the appended claims without departing from the spirit thereof.

Detailed description

Referring now to the drawing, it will be noted that there has been provided a holder indicated generally at A, which is adapted for containing a stack of articles, for instance glass slides B, which may be dispensed one at a time by actuating a reciprocating ejector C.

In its structural features, the holder A defines a box-shaped magazine having a bottom wall 10, opposing side walls 11—11', rear wall 12 and front wall 14. The top of this holder defines a rectangular opening 15 through which the slides B may be inserted into the confines of the holder. As shown in the drawing, the front wall 14 has a vertical recess 16 extending downwardly therein from its upper edge 17 (see Figure 4) to a point below the top of the ejector. A removable cover 18 has depending marginal flanges 19 thereon, which are adapted to be telescoped over the upper part of the holder.

After removing the cover 18, a stack of slides B may be lowered into the holder A until the lowermost slide 20 rests upon a slide-receiving face 21 of a rectangular-shaped plunger 22 forming part of the ejector C. The recess 16 has sufficient width to permit an individual's thumb and finger to maintain a firm grip on the stack of slides as they are lowered toward the plunger 22.

Turning to Figures 2 to 4, inclusive, it will be observed that the inner confronting surfaces of the side walls 11—11' of the holder are provided with inclined guideways 23—23', respectively, which engage with opposing ends 24 of the slides B as they are lowered, thus centering these slides relative to the holder, even though adjacent ends of the slides may not be in registration with one another as the stack is initially inserted into the holder. It will be noted that the guideways 23—23' converge downwardy relative to one another.

The side walls 11—11' are fashioned with rectangular-shaped discharge slots 25—25', respectively, which register with the lowermost slide 20 in the stack, when this slide is supported on the plunger 22. As clearly shown in Figure 2, the lower ends of the guideways terminate immediately above the discharge slots to allow a slide to pass through the latter.

In order to eject the slides from the holder, the plunger 22 has been provided with a detent 26 thereon having plate-engaging ends 26a and 26b. When this plunger is arranged in the manner shown in Figures 2 and 5, the detent end 26a projects above the uppermost face 21 of the plunger so as to engage with the left-hand end of the lowermost slide 20 in the stack. Thus it will be apparent that when the plunger 22 is moved to the right in Figure 2, the engaged slide will be partially ejected through the opening 25 in the side wall 11, where it may be grasped by an individual and completely withdrawn.

Particular attention is called to the fact that the detent 26 is dimensioned for movement into a position underneath the lowermost end of the guideways 23', when the plunger 22 is retracted to the left, as in Figure 2. This will assure the fact that the next slide B in the stack will drop in front of the detent end 26a and come to rest on the slide-receiving face 21 of the ejector.

For the purpose of reciprocating the plunger 22, it has been provided with an operating handle 27 projecting therefrom to extend through the recess 16. This handle has been illustrated as being triangular in cross-section, with its apex 28 pointing in the direction in which the slides B are to be ejected from the holder A.

It will be noted that the detent end 26b projects below the underneath face 29 of the plunger 22 in Figures 2, 4 and 5, and is accommodated in a groove 30 fashioned in the upper surface of the bottom wall 10, this groove extending between the side walls 11—11'. The latter defines rails 31 on opposite sides of the groove 30 along which the plunger 22 is adapted to move.

When it is desired to dispense the glass slides B, or other articles, through the discharge slot 25' in the left-hand side wall 11', the plunger 22 is turned upside down and reversed end-for-end, as disclosed in Figure 7. The recess 16 will permit the plunger 22 to be reversed in this manner, without removing the latter from the holder. At this time the detent end 26a will fit into the groove 30, while the detent end 26b will project upwardly to engage behind the lowermost slide 20' in the stack, this slide resting on the face 29 of the plunger. The detent 26 may be moved into a position underneath the right-hand guideways 23, as in Figure 7 so that the lowermost slide 20' will drop onto the plunger surface 29 in front of the detent end 26b. Again the apex 28 of the handle 27 will indicate the direction in which the slides B will be ejected.

The holder may be conveniently secured to a wall D by inserting screws 32 through apertured bosses 33 projecting from the rear wall 12. As shown in Figure 4, these bosses space the holder A sufficiently forward of the wall D to allow the cover 18 to be applied or removed. In order to steady the holder, the rear wall 12 has been provided with a pair of parallel ribs 34 thereon, which abut the room wall D.

In some situations, it will be found desirable to mount the holder on a desk E, counter, shelf, or the like, as suggested in Figure 7. For this reason the bottom wall 10 has been provided with countersunk openings 35 for receiving anchoring screws.

Summary of operation

Assuming that the physician, or other technician, desires to dispense glass slides B through the discharge slot 25 in the right-hand side wall 11 of the holder A, the plunger 22 initially is moved to the left until its detent 26 is disposed beneath the inclined guideways 23' on the wall 11', as in Figure 2.

After removing the cover 18, the individual grasps a stack of glass slides B, and lowers them into the interior of the holder, while the individual's thumb and finger are moved downwardly through the frontal recess 16 of the holder, until the lowermost slide 20 comes to rest on the upper face 21 of the ejector plunger.

As the slides move downwardly, they are urged into a central position relative to the holder by the inclined guideways 23—23' engaging with opposing ends 24 of the slides. Inasmuch as the recess 16 extends below the plunger 22, the slides may be gently lowered upon this plunger, and the individual's thumb and finger withdrawn, without dropping the slides. Now the cover 18 is replaced over the top of the holder.

With the holder thus loaded, it will be apparent that each time the plunger 22 is moved to the right by actuating the handle 27, the detent end 26a will partially eject a slide through the slot 25 in the right-hand wall 11. Obviously, the individual may grasp the projecting part of this slide and entirely remove the slide from the holder, with any finger prints being confined to the gripped portion thereof. Upon moving the plunger to the left, the next slide in the stack will come to rest on the slide-receiving face 21 of the ejector plunger, in a position to be dispensed.

In the event that the slides, or other articles, are to be ejected through the discharge slot 25' in the left-hand side wall 11', the handle 27 may be raised in the frontal recess 16, prior to placing the slides in the holder, and then the plunger 22 turned upside down and reversed end-for-end so that the slide-receiving face 29 of the plunger will be uppermost, as shown in Figure 7. Upon lowering the plunger until its face 21 bears against the rails 31, the detent end 26a will enter the groove 30. The apex 28 of the handle 27 will point towards the left, indicating the fact that the slides will be discharged in that direction by reciprocating the plunger. Thus the slides may be ejected from either side of the holder by simply turning the plunger and its detent upside down and reversing the plunger end-for-end, without removing any mechanism from the holder.

I claim:

1. In an ejector-type article holder and dispenser: a holder defining a box-shaped magazine, including a bottom wall, opposing side walls and a front wall; the bottom wall having a groove in its upper surface extending between the side walls, and further defining rails bordering this groove; a reciprocating ejector, including a plunger slidably disposed on said rails; the plunger having a detent at one end thereof; the detent being provided with top and bottom ends projecting above and below the plunger, respectively; the top end of the detent being engageable with the lowermost article of a stack of articles disposed in the holder above the plunger; each side wall of the holder having a discharge slot through which the engaged article may be ejected; the plunger and its detent being adapted to be turned upside down and the plunger reversed end-for-end, whereby articles may be selectively ejected through the discharge slot in either side wall; the ends of the detent being dimensioned to fit into said groove in the bottom wall, whereby either end of the detent will fit into said groove when the other end of the detent projects above the plunger.

2. In an ejector-type article holder and dispenser: a holder defining a box-shaped magazine, including a bottom wall, opposing side walls and a front wall; the bottom wall having a groove in its upper surface extending between the side walls, and further defining rails bordering this groove; a reciprocating ejector, including a plunger slidably disposed on said rails; the plunger having a detent at one end thereof; the detent being provided with top and bottom ends projecting above and below the plunger, respectively; the top end of the detent being engageable with the lowermost article of a stack of articles disposed in the holder above the plunger; each side wall of the holder having a discharge slot through which the engaged article may be ejected; the plunger and its detent being adapted to be turned upside down and the plunger reversed end-for-end, whereby articles may be selectively ejected through the discharge slot in either side wall; the ends of the detent being dimensioned to fit into said groove in the bottom wall, whereby either end of the detent will fit into said groove when the other end of the detent projects above the plunger; the front wall of the holder having a recess extending downwardly thereinto from its top, through which the thumb and finger of an individual may extend, when these digits are engaged with a stack of articles and the latter are lowered in the holder.

3. In an ejector-type article holder and dispenser: a holder defining a box-shaped magazine, including a bottom wall, opposing side walls and a front wall; the bottom wall having a groove in its upper surface extending between the side walls, and further defining rails bordering this groove; a reciprocating ejector, including a plunger slidably disposed on said rails; the plunger having a detent at one end thereof; the detent being provided with top and bottom ends projecting above and below the plunger, respectively; the top end of the detent being engageable with the lowermost article of a stack of articles disposed in the holder above the plunger; each side wall of the holder having a discharge slot through which the engaged article may be ejected; the plunger and its detent being adapted to be turned upside down and the plunger reversed end-for-end, whereby articles may be selectively ejected through the discharge slot in either side wall; the ends of the detent being dimensioned to fit into said groove in the bottom wall, whereby either end of the detent will fit into said groove when the other end of the detent projects above the plunger; the front wall of the holder having a recess extending downwardly thereinto from its top, through which the thumb and finger of an individual may extend, when these digits are engaged with a stack of articles and the latter are lowered in the holder; the recess in the front wall extending below the upper surface of the plunger.

4. In an ejector-type article holder and dispenser: a holder defining a box-like magazine, including a bottom wall, opposing side walls and a front wall; the bottom wall having a groove in its upper surface extending between the side walls, and further defining rails bordering this groove; a reciprocating ejector, including a plunger slidably disposed on said rails the plunger having a detent at one end thereof; the detent being provided with top and bottom ends projecting above and below the plunger, respectively; the top end of the detent being engageable with the lowermost article of a stack of articles disposed in the holder above the plunger; each side wall of the holder having a discharge slot through which the engaged article may be ejected; the plunger and its detent being adapted to be turned upside down and the plunger reversed end-for-end, whereby articles may be selectively ejected through the discharge slot in either side wall; the ends of the detent being dimensioned to fit into said groove in the bottom wall, whereby either end of the detent will fit into said groove when the other end of the detent projecs above the plunger; the front wall of the holder having a recess extending downwardly thereinto from its top, through which the thumb and finger of an individual may extend, when these digits are engaged with a stack of articles and the latter are lowered in the holder; the recess in the front wall extending below the upper surface of the plunger; the plunger having an operating handle extending through the recess in said front wall, and this recess being dimensioned to allow the plunger to be lifted by the handle, turned upside down and reversed end-for-end.

5. In an ejector-type article holder and dispenser: a holder defining a box-shaped magazine, including a bottom wall, oposing side walls and a front wall; the bottom wall having a groove in its upper surface extending between the side walls, and further defining rails bordering this groove; a reciprocating ejector, including a plunger slidably disposed on said rails; the plunger having a detent at one end thereof; the detent being provided with top and bottom ends projecting above and below the plunger, respectively; the top end of the detent being engageable with the lowermost article of a stack of articles disposed in the holder above the plunger; each side wall of the holder having a discharge slot through which the engaged article may be ejected; the plunger and its detent being adapted to be turned upside down and the plunger reversed end-for-end, whereby articles may be selectively ejected through the discharge slot in either side wall; the ends of the detent being dimensioned to fit into said groove in the bottom wall, whereby either end of the detent will fit into said groove when the other end of the detent projects above the plunger; and inclined guideways provided on the confronting surfaces of the side walls of the holder, and positioned to engage with the opposing ends of the article and to center the latter as they descend toward the plunger.

6. In an ejecor-type article holder and dispenser: a holder defining a box-shaped magazine, including a bottom wall, opposing side walls and a front wall; the bottom wall having a groove in its upper surface extending between the side walls, and further defining rails bordering this groove; a reciprocating ejector, including a plunger slidably disposed on said rails; the plunger having a detent at one end thereof; the detent being provided with top and bottom ends projecting above and below the plunger, respectively; the top end of the detent being engageable with the lowermost article of a stack of articles disposed in the holder above the plunger; each side wall of the holder having a discharge slot through which the engaged article may be ejected; the plunger and its detent being adapted to be turned upside down and the plunger reversed end-for-end, whereby articles may be selectively ejected through the discharge slot in either side wall; the ends of the detent being dimensioned to fit into said groove in the bottom wall, whereby either end of the detent will fit into said groove when the other end of the detent projects above the plunger; and inclined guideways provided on the confronting surfaces of the side walls of the holder, and positioned to engage with opposing ends of the article and to center the latter as they descend toward the plunger; these guideways having lower ends terminating substantially at the discharge slots in the side walls of the holder; the detent being dimensioned for movement into a position underneath said lower ends of the guideways.

No references cited.